United States Patent
Kimura (10) Patent No.: US 8,219,232 B2
(45) Date of Patent: Jul. 10, 2012

(54) ASSEMBLY SYSTEM ASSEMBLING A PLURALITY OF KINDS OF AUTOMOTIVE PARTS

(75) Inventor: Hirofumi Kimura, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 552 days.

(21) Appl. No.: 12/398,778

(22) Filed: Mar. 5, 2009

(65) Prior Publication Data

US 2009/0234487 A1    Sep. 17, 2009

(30) Foreign Application Priority Data

Mar. 12, 2008  (JP) ................................. 2008-062485
Mar. 12, 2008  (JP) ................................. 2008-062987

(51) Int. Cl.
*G06F 19/00*    (2011.01)
(52) U.S. Cl. ........................................ 700/112; 700/113
(58) Field of Classification Search .................. 700/112, 700/113
See application file for complete search history.

(56) References Cited

U.S. PATENT DOCUMENTS

| | | | | |
|---|---|---|---|---|
| 4,894,908 A | * | 1/1990 | Haba et al. | 29/711 |
| 5,347,700 A | * | 9/1994 | Tominaga et al. | 29/430 |
| 5,771,554 A | * | 6/1998 | Komiya | 29/430 |
| 6,202,296 B1 | * | 3/2001 | Tatsuda et al. | 29/784 |
| 6,804,880 B2 | * | 10/2004 | Yamamoto | 29/700 |
| 2005/0223545 A1 | * | 10/2005 | Tateishi et al. | 29/700 |

FOREIGN PATENT DOCUMENTS

| | | |
|---|---|---|
| JP | 04-075833 A | 3/1992 |
| JP | 04-275841 A | 10/1992 |
| JP | 05-069253 A | 3/1993 |
| JP | 05-261635 A | 10/1993 |
| JP | 2001-353627 A | 12/2001 |
| JP | 2004-291170 A | 10/2004 |

OTHER PUBLICATIONS

Machine Translation of JP2004-291170.*

* cited by examiner

*Primary Examiner* — Ryan Jarrett
(74) *Attorney, Agent, or Firm* — Arent Fox LLP (57) ABSTRACT

An objective of the present invention is to provide an assembly system capable of reducing the equipment space while various kinds of automotive parts are assembled on one production line. The assembly system assembles plural kinds of automotive parts consisting of a main body and a part to be installed to the main body. This assembly system comprises an operator area at which an operator is assigned, a plurality of travel carts on which a main body of each of automotive parts is placed, traveling along the operator area, a part pallet on which a part to be installed to each of the automotive parts is placed, a belt conveyer conveying this part pallet along the operator area, and a control device controlling thereof. The control device drives the travel carts and the belt conveyer so as to convey the travel carts and the part pallet synchronously.

3 Claims, 6 Drawing Sheets

ASSEMBLY SYSTEM ASSEMBLING A PLURALITY OF KINDS OF AUTOMOTIVE PARTS

This application is based on and claims the benefit of priority from Japanese Patent Application Nos. 2008-062485 and 2008-062987, filed on 12 Mar. 2008, the content of which is incorporated herein by reference.

BACKGROUND OF THE INVENTION

1. Field of the Invention

The present invention relates to an assembly system. Specifically, the present invention relates to an assembly system assembling a plurality of kinds of automotive parts consisting of a main body and a part to be installed to the main body.

2. Related Art

Conventionally, in the automotive manufacturing process, automotive parts such as a door, an instrument panel, and a bumper are assembled with separate production lines. However, to downsize manufacturing facilities, it has been requested in recent years that the number of the production lines is reduced, and various kinds of automotive parts are assembled on one production line.

Thus, it is considered that various kinds of automotive parts are assembled manually. However, there is a problem that operation's operation becomes complex, and the cycle time is prolonged. To solve this problem, for example, a technique for dividing the inside of a stocker to provide a plurality of trays, storing various kinds of parts are stored in these trays, and moving a tray in which parts to be assembled to this work are stored to a part take-out position corresponding to the conveyed work type has been proposed (refer to Japanese Published Unexamined Patent Application 2001-353627). Accordingly, an operator simply takes out parts from the tray at the part take-out position to assemble them to the work, so that the cycle time can be prevented being prolonged.

However, in this technique, there has been a problem that the number of the types of installing parts increases, which requires to place a lot of parts around an operator, thus increasing the equipment space.

SUMMARY OF THE INVENTION

An objective of the present invention is to provide an assembly system capable of assembling various kinds of automotive parts on one production line with the equipment space reduced.

The assembly system of the present invention (for example, the below-mentioned assembly systems 1) assembling a plurality of kinds of automotive parts consisting of a main body (for example, the below-mentioned main bodies 71-74) and a part to be installed to the main body, comprises an operator area (for example, the below-mentioned operator area 50) at which an operator is assigned; a plurality of first pallets (for example, the below-mentioned main body pallet 25) on which the main body of each of the automotive parts is placed; a first conveyance device (for example, the below-mentioned travel device 26) conveying the first pallet along the operator area; a plurality of second pallets (for example, the below-mentioned part pallet 30) on which the part to be installed to each of the main body is placed; a second conveyance device (for example, the below-mentioned belt conveyor 40) conveying the second pallet along the operator area; a control device (for example, the below-mentioned control device 60) controlling thereof, wherein the control device drives the first conveyance device and the second conveyance device to convey the first pallet and the second pallet synchronously.

According to the present invention, the first pallet and the second pallet are conveyed synchronously. Thus, in the operator area, an operator can assemble automotive parts only by taking out a part from the second pallet and then install it to the main body placed on the first pallet. Therefore, various kinds of automotive parts can be assembled on one production line. In addition, it is unnecessary that a lot of parts are placed around an operator as seen in conventional way, so that the equipment space can be reduced. Furthermore, the process in which an operator picks up a part corresponding to the work at the part supply place is omissible, so that an operator can assemble different kinds of automotive parts on the adjacent first pallet by using the time required for this process. Therefore, an operator can efficiently operate even when various kinds of automotive parts are on the same product line.

In this case, it is preferable that the first conveyance device is a travel device provided for each of the first pallets, traveling along a prescribed route.

According to the present invention, the first conveyance device is the travel device provided for each of the first pallets. Therefore, by properly setting the travel route of the travel device, the first pallet can be carried out during the operator area without conveying the first pallet from the starting point to the terminal point of the operator area when the assembly of automotive parts placed on the first pallet is completed. Therefore, the cycle time can be shortened.

The assembly system of the present invention (for example, the below-mentioned assembly systems 101) assembling a plurality of kinds of automotive parts consisting of a main body (for example, the below-mentioned main bodies 171-174) and a part to be installed to the main body, comprises: a plurality of first pallets (for example, the below-mentioned main body pallet 125 and the second part pallet 127) on which the main body and the part of each of the plurality of kinds of automotive parts are placed; a plurality of second pallets (for example, the below-mentioned part pallet 130) on which the part of each of the plurality of kinds of automotive parts is placed; a conveyance device (for example, the below-mentioned travel device 126 and the belt conveyer 140) conveying the first pallet and the second pallet; a main line (for example, the below-mentioned main line 150) along which an operator is assigned; a bypass line (for example, the below-mentioned bypass line 180) offset from the main line, along which a robot (for example, RB101-RB105) is assigned; a control device (for example, the below-mentioned control device 160) controlling thereof, wherein the control device is provided with a conveyance route configuration means (for example, the below-mentioned conveyance route configuration means 161) of setting a conveyance route of the conveyance device by at least one of the main line and the bypass line, a conveyance device drive means (for example, the below-mentioned conveyance device drive means 162) of driving the conveyance device to convey the first pallet and the second pallet synchronously along the conveyance route set by the conveyance route configuration means, and a robot drive means of driving the robot along the bypass line to take out the part from the first pallet and then install the part to the main body placed on the first pallet (for example, the below-mentioned robot drive means 163).

According to this invention, the conveyance route of the conveyance device is set first. Second, the main body of each of various kinds of automotive parts is placed on the first pallet, and then parts installed to be installed to these main bodies are placed on the first pallet and the second pallet.

Third, while the first pallet and the second pallet are conveyed synchronously, the robot along the bypass line takes the part out from the first pallet and then installed to the main body placed on the first pallet. Meanwhile, in the main line, an operator takes out the part from the second pallet and then installs it to the main body placed on the first pallet. Therefore, an operator and a robot can assemble various kinds of automotive parts on one production line, reducing the equipment space. In addition, an operator is assigned along the main line, and a robot is assigned along the bypass line offset from this main line, so that the area at which an operator is assigned and the area at which a robot is assigned can be divided to ensure the safety.

In this case, it is preferable that the conveyance route configuration means of the control means eliminates the bypass line from the conveyance route under certain conditions.

If there are no operation failures of a robot, the conveyance route of the conveyance device is set to include the bypass line. Accordingly, each of the pallets is conveyed along the bypass line along which a robot is assigned, and then automotive parts are assembled by the robot along the bypass line. At this time, for example, when an operation failure of a robot assigned along the bypass line occurs, this bypass line is eliminated from the conveyance route of the conveyance device. Therefore, each of the pallets is not conveyed along this bypass line, so that it is possible to perform maintenance on the robot having a failure without stopping assembly operation of automotive parts.

In this case, it is preferable that the conveyance device drive means of the control means conveys the first pallet and the second pallet so as to pass through at least one of robots along the bypass line, under certain conditions.

For example, when an operation failure of a robot occurs, each of the pallets is conveyed so as to pass through this robot having a failure. Therefore, it is possible to perform maintenance on the robot having a failure without stopping assembly operation of automotive parts.

According to the present invention, the first pallet and the second pallet are conveyed synchronously. Thus, in the operator area, an operator can assemble automotive parts only by taking out a part from the second pallet and then install it to the main body placed on the first pallet. Therefore, various kinds of automotive parts can be assembled on one production line. In addition, it is unnecessary that a lot of parts are placed around an operator as seen in conventional way, so that the equipment space can be reduced. Furthermore, the process in which an operator picks up a part corresponding to the work at the part supply place is omissible, so that an operator can assemble different kinds of automotive parts on the adjacent first pallet by using the time required for this process. Therefore, an operator can efficiently operate even when various kinds of automotive parts are on the same product line.

According to this invention, the conveyance route of the conveyance device is set first. Second, the main body of each of various kinds of automotive parts is placed on the first pallet, and then parts to be installed to the main body are placed on the first pallet and the second pallet. Third, while the first pallet and the second pallet are conveyed synchronously, a robot along bypass line takes out the part from the first pallet and then installs it to the main body placed on the first pallet. Meanwhile, in the main line, an operator takes out the part from the second pallet and then installs it to the main body placed on the first pallet. Therefore, an operator and a robot can assemble various kinds of automotive parts on one production line, reducing the equipment space. In addition, an operator is assigned along the main line, and a robot is assigned along the bypass line offset from this main line, so that the area at which an operator is assigned and the area at which a robot is assigned can be divided to ensure the safety.

DETAILED DESCRIPTION OF THE INVENTION

Embodiments of the present invention are described in more detail with reference to the accompanying drawings. In the following description regarding the embodiments, the same reference number is assigned to the same components, and explanations thereof are omitted or simplified.

First Embodiment

Figure 1:
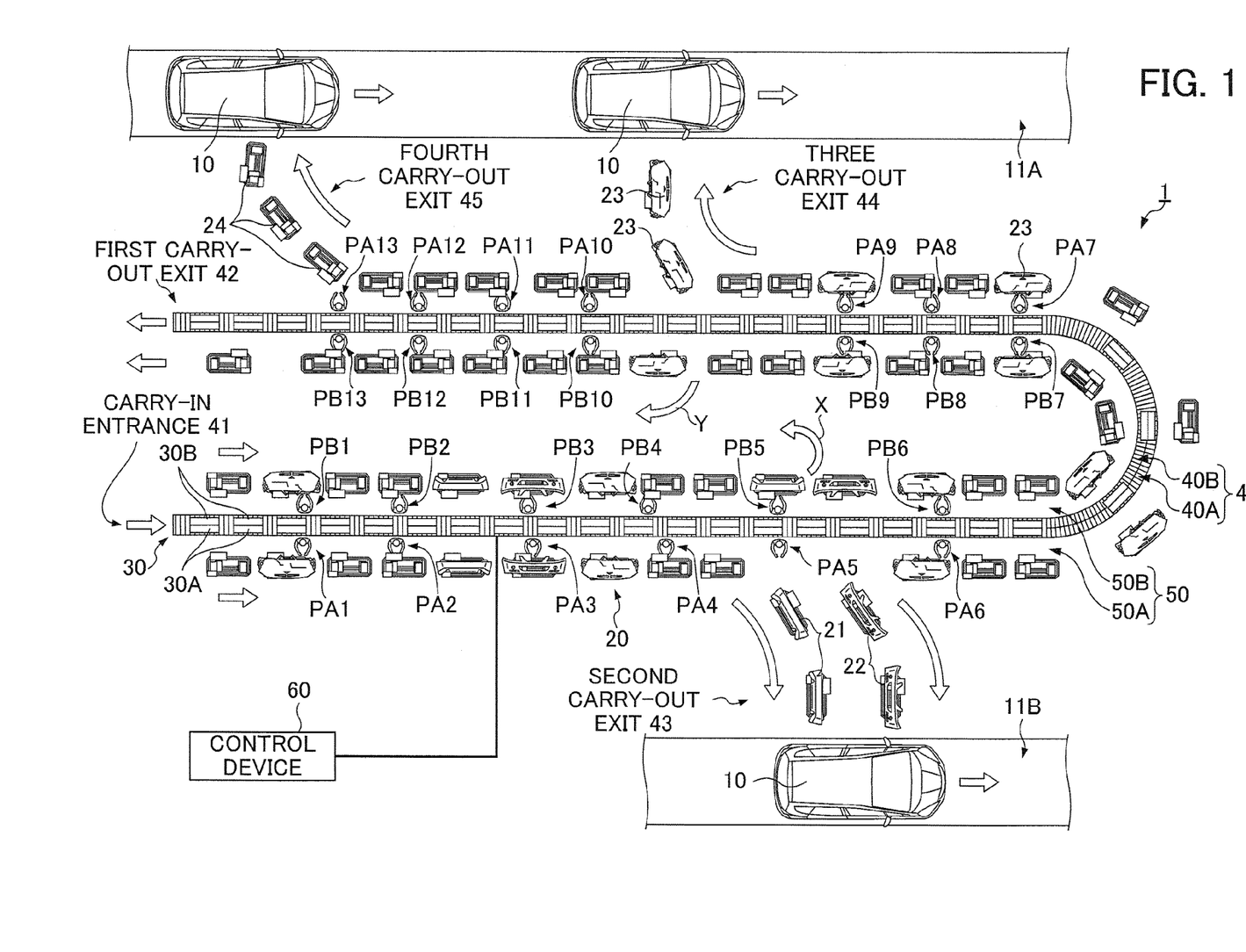
FIG. 1 is a schematic configuration diagram of the assembly system according to the first embodiment of the present invention.

FIG. 1 is a schematic configuration diagram of the assembly system 1 according to the first embodiment of the present invention. The assembly system 1 assembles plural kinds of automotive parts consisting of a main body and a part to be installed to the main body. For example, the automotive parts are a right door, a left door, an instrument panel, a front bumper, and a rear bumper.

This assembly system 1 is located between the two body conveyance lines 11A and 11B conveying the body 10 of an automobile. This assembly system 1 is provided with a plurality of the travel carts 20, the part pallets 30 as a plurality of the second pallet, the belt conveyer 40 as the second conveyance device conveying these part pallets 30, the operator area 50 located across this belt conveyer 40, at which an operator is assigned, and the control device 60 controlling the travel cart 20 and the belt conveyer 40.

The belt conveyer 40 extends in a approximate U-shape from the carry-in entrance 41 to the first carry-out exit 42. When the part pallet 30 is supplied to the carry-in entrance 41, this belt conveyer 40 conveys this part pallet 30 and carries it out from the first carry-out exit 42. This belt conveyer 40 is provided with the outer belt conveyer 40A and the inner belt conveyer 40B located medially along the outer belt conveyer 40A.

In addition, the second carry-out exit 43, the third carry-out exit 44, and the fourth carry-out exit 45 are provided on the way of the outer belt conveyer 40A.

The operator area 50 is provided with the outer operator area 50A located laterally along the belt conveyer 40 and the inner operator area 50B located medially along the belt conveyer 40. That is, the outer operator area 50A is located along the outer belt conveyer 40A, and the inner operator area 50B is located along the inner belt conveyer 40B.

In the outer operator area 50A, a plurality of operators are assigned sequentially starting from the carry-in entrance 41 side. For example, thirteen operators PA1-PA13 are assigned herein. Among these operators, five operators PA1-PA5 are assigned between the carry-in entrance 41 and the second carry-out exit 43, nine operators PA1-PA9 are assigned between the carry-in entrance 41 and the third carry-out exit 44, and thirteen operators PA1-PA13 are assigned between the carry-in entrance 41 and the fourth carry-out exit 45, in the outer operator area 50A.

On the other hand, in the inner operator area 50B, a plurality of operators are assigned sequentially starting from the carry-in entrance 41 side. For example, thirteen operators PB1-PB13 are assigned herein.

Figure 2:
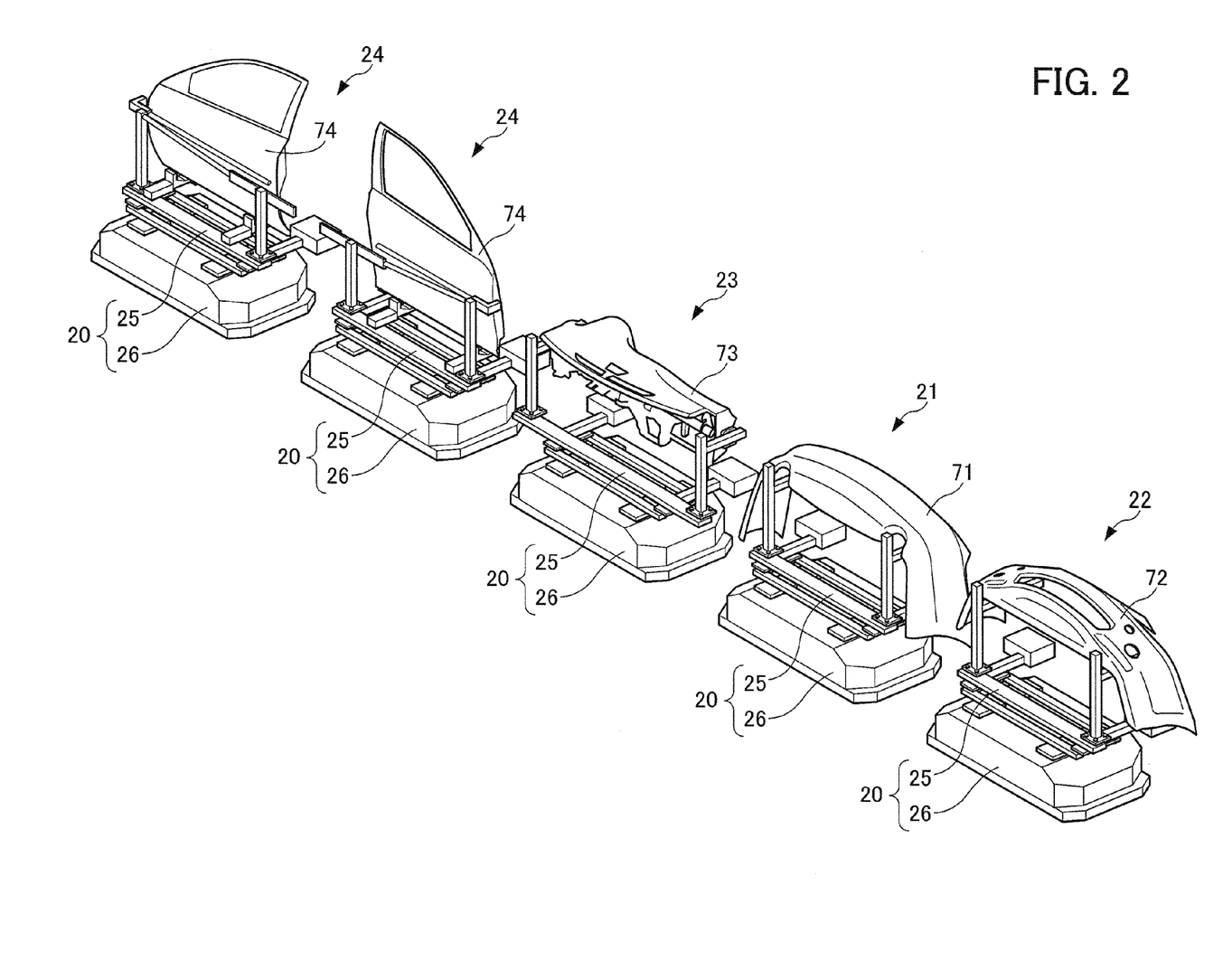
FIG. 2 is a perspective view of the travel cart of the assembly system according to the embodiment.

FIG. 2 is a perspective view of the travel cart 20. Each of the travel carts 20 is provided with the main body pallet 25 as the first pallet on which each of the main bodies 71-74 of a plurality of kinds of automotive parts is placed and the travel device 26 as the first conveyance device conveying this main body pallet 25.

Each of the travel devices 26 travels through the prescribed route according to instruction of the control device 60.

The travel carts 20 includes the travel carts 21, 22, 23, and 24 on which the main body 71 of a rear bumper, the main body 72 of a front bumper, the main body 73 of an instrument panel, and the main body 74 of a right or left door as main bodies of automotive parts placed on each of the main body pallets 25 are placed respectively.

Returning to FIG. 1, the travel carts 21 and 22 travel along the outer operator area 50A, and reach the second carry-out exit 43, when supplied to the outer operator area 50A side of the carry-in entrance 41. In addition, the travel carts 21 and 22 travel along the inner operator area 50B and reach the first carry-out exit 42, when supplied to the inner operator area 50B side of the carry-in entrance 41.

The travel cart 23 travels along the outer operator area 50A, and reaches the third carry-out exit 44, when supplied to the outer operator area 50A side of the carry-in entrance 41. In addition, the travel cart 23 travels along the inner operator area 50B, and reaches the first carry-out exit 42, when supplied to the inner operator area 50B side of the carry-in entrance 41.

The travel cart 24 travels along the outer operator area 50A, and reaches the fourth carry-out exit 45, when supplied to the outer operator area 50A side of the carry-in entrance 41. In addition, the travel cart 24 travels along the inner operator area 50B, and reaches the first carry-out exit 42, when supplied to the inner operator area 50B side of the carry-in entrance 41.

The part pallet 30 has a box-shape, in which the upper part is opened. On this part pallet 30, a part to be installed to each of main bodies 71-74 of automotive parts is placed according to the types of automotive parts on the travel carts 21-24 supplied to the carry-in entrance 41. This part pallet 30 consists of the outer part pallet 30A supplied to the outer belt conveyer 40A and the inner part pallet 30B supplied to the inner belt conveyer 40B.

Besides instructing each travel cart 20 to take a travel route, the control device 60 drives the travel cart 20 and the belt conveyer 40 to convey the travel cart 20 and the part pallet 30 synchronously. Specifically, while driving the outer belt conveyer 40A to convey the outer part pallet 30A, the control device 60 allows the travel carts 21-24 supplied to the outer operator area 50A side of the carry-in entrance 41 to travel, synchronizing with the outer part pallet 30A. In addition, while driving the inner belt conveyer 40B to convey the inner part pallet 30B, the control device 60 allows the travel carts 21-24 supplied to the inner operator area 50B side of the carry-in entrance 41 to travel, synchronizing with the inner part pallet 30B.

Operation of the above-mentioned assembly system 1 is described as follows. While allowing the four kinds of the travel carts 21-24 to travel along the same product line from the carry-in entrance 41, and the system supplies the part pallets 30 associated with these travel carts 21-24.

Then, the travel carts 21 and 22 supplied to the outer operator area 50A side of the carry-in entrance 41 travel along the outer operator area 50A. In the outer operator area 50A, five operators PA1-PA5 install parts to the main body 71 of a front bumper and the main body 72 of a rear bumper placed on the travel carts 21 and 22 respectively. Subsequently, these travel carts 21 and 22 are carried out from the second carry-out exit 43 to install the rear bumper and the front bumper placed on the travel carts 21 and 22 respectively to the body 10 on the body conveyer 11B in the second carry-out exit 43.

In addition, the travel cart 23 supplied to the outer operator area 50A side of the carry-in entrance 41 travels along the outer operator area 50A. In the outer operator area 50A, nine operators PA1-PA9 install parts to the main body 73 of an instrument panel placed on the travel cart 23. Subsequently, this travel cart 23 is carried out from the third carry-out exit 44 to install the instrument panel placed on the travel cart 23 to the body 10 on the body conveyer 11A in the third carry-out exit 44.

Furthermore, the travel cart 24 supplied to the outer operator area 50A side of the carry-in entrance 41 travels along the outer operator area 50A. In the outer operator area 50A, thirteen operators PA1-PA13 install parts to the main body 74 of a door placed on the travel cart 24. Subsequently, this travel cart 24 is carried out from the fourth carry-out exit 45 to install the door placed on the travel cart 24 to the body 10 on the body conveyer 11A in the fourth carry-out exit 45.

Meanwhile, the travel carts 21-24 supplied to the inner operator area 50B side of the carry-in entrance 41 travel along the inner operator area 50B. In the inner operator area 50B, thirteen operators PB1-PB13 install parts to the main bodies 71-74 of automotive parts placed on the travel carts 21-24 respectively. Subsequently, these travel carts 21-24 are carried out from the first carry-out exit 42.

The present embodiment provides the following effects.

(1) The main body pallet 25 and the part pallet 30 are conveyed synchronously. Accordingly, in the operator area 50, the travel cart 20 supplies the main body of an automotive part to the front side of each of the operators PA1-PA13 and PB1-PB13, and the part pallet 30 supplies the parts to be installed to this main body are supplied to the rear side of each of the operators PA1-PA13 and PB1-PB13. Thus, in the operator area 50, an operator can assemble the automotive parts only by taking out a part from the part pallet 30 at the rear side and then install it to the main bodies 71-74 of automotive parts placed on the main body pallets 25 at the front side. Therefore, various kinds of automotive parts can be assembled on one production line. In addition, it is unnecessary that a lot of parts are placed around an operator as seen in conventional way, so that the equipment space can be reduced. Furthermore, the process in which an operator picks up a part corresponding to the work at the part supply place is omissible, so that an operator can assemble different kinds of automotive parts on the adjacent main body pallet 25 by using the time required for this process. Therefore, an operator can efficiently operate even when various kinds of automotive parts are on the same product line.

(2) The travel cart 20 is configured to provide with the travel device 26 to each of the main body pallets 25. Accordingly the travel cart 20 is charged into the carry-in entrance 41 by properly setting the travel route of the travel device 26, whereby this travel cart 20 can be carried it out from the second carry-out exit 43, the third carry-out exit 44, and the fourth carry-out exit 45 during the operator area 50 without this travel cart 20 traveling from the carry-in entrance 41 to the first carry-out exit 42, when the assembly operation of automotive parts placed on this travel cart 20 is completed. Therefore, the cycle time can be shortened.

Second Embodiment

Figure 3:
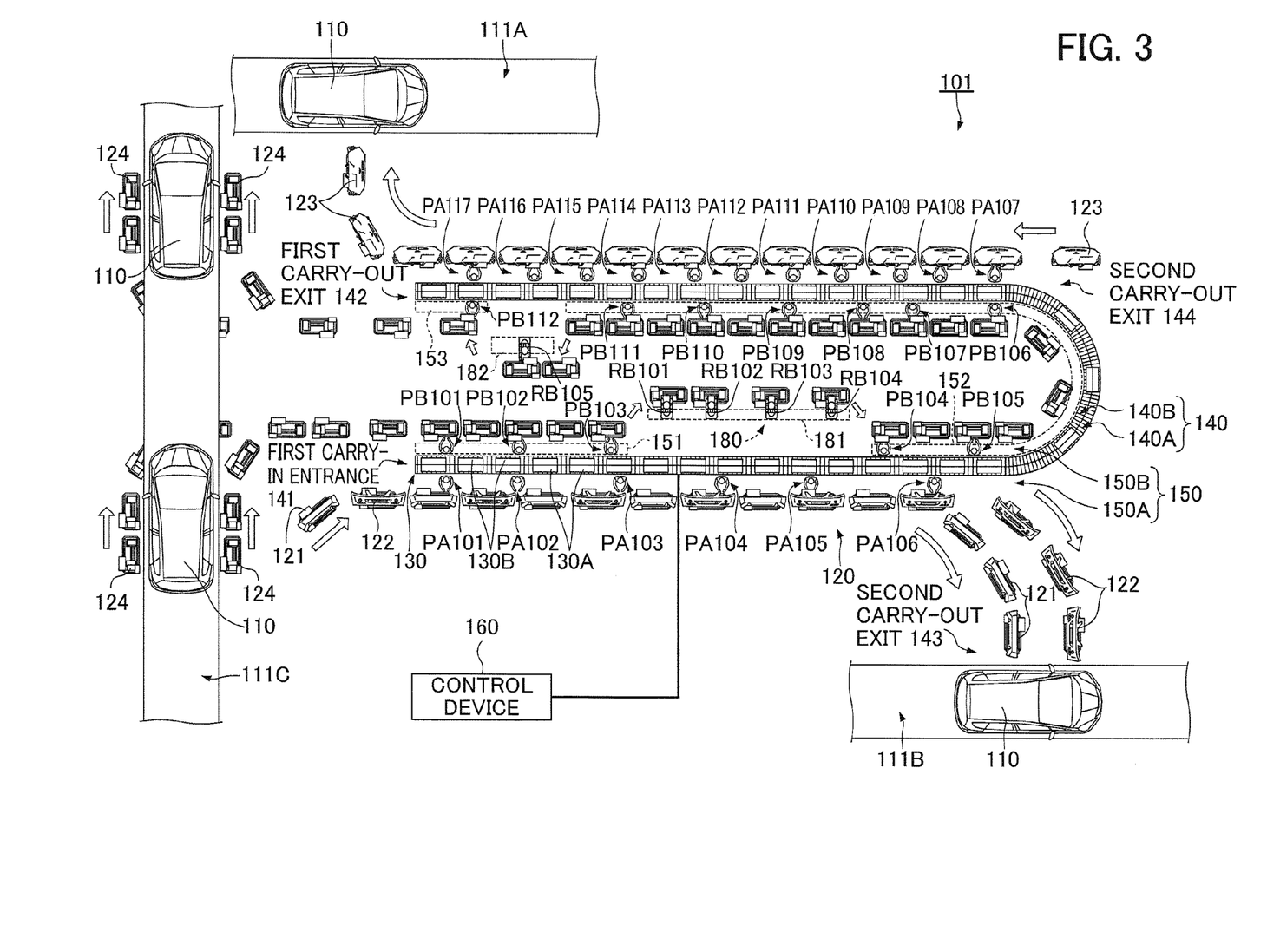
FIG. 3 is a schematic configuration diagram of the assembly system according to the second embodiment of the present invention.

FIG. 3 is a schematic configuration diagram of the assembly system 101 according to the second embodiment of the present invention. The assembly system 101 assembles plural kinds of automotive parts consisting of a main body and a part to be installed to the main body. For example, the automotive parts are a right door, a left door, an instrument panel, a front bumper, and a rear bumper.

This assembly system 101 is located surrounded the three body conveyer 111A, 111B, and 111C conveying the body 110 of an automobile. This assembly system 101 is provided with a plurality of the travel carts 120, the part pallets 130 as a plurality of the second pallets, the belt conveyer 140 as the second conveyance device conveying these part pallets 130, the main line 150 located across this belt conveyer 140, along which an operator is assigned, the bypass line 180 offset from this main line 150, along which the robot RB is assigned, and the control device 160 controlling the travel cart 120, the belt conveyer 140, and the robot RB.

The belt conveyer 140 extends in a approximate U-shape from the first carry-in entrance 141 to the first carry-out exit 142. When the part pallet 130 is supplied to the first carry-in entrance 141, this belt conveyer 140 conveys this part pallet 130 and carries it out from the first carry-out exit 142. This belt conveyer 140 is provided with the outer belt conveyer 140A and the inner belt conveyer 140B located medially along this outer belt conveyer 140A. In FIG. 3, to facilitate the understanding of the configuration of assembly system 101, the body conveyers 111A-111C are located in vicinity to the carry-in entrance 141 and the carry-out exits 142 and 143. However, these body conveyers 111A-111C are actually located substantially away from the carry-in entrance 141 and the carry-out exits 142 and 143.

In addition, the second carry-out exit 143 is provided on the way of the outer belt conveyer 140A, and the second carry-in entrance 144 is provided between this second carry-out exit 143 and the first carry-out exit 142.

The main line 150 is provided with the outer main line 150A located laterally along the belt conveyer 140 and the inner main line 150B located medially along the belt conveyer 140. That is, the outer main line 150A is located along the outer belt conveyer 140A, and the inner main line 150B is located along the inner belt conveyer 140B.

Between the first carry-out exit 141 and the second carry-out exit 143 of the outer main line 150A, six operators PA101-PA106 are assigned sequentially starting from the first carry-in entrance 141 side. In addition, between the second carry-in entrance 144 and the first carry-out exit 142 of the outer main line 150A, eleven operators PA107-PA117 are assigned sequentially starting from the second carry-in entrance 144 side.

The inner main line 150B is provided with the first main line 151 provided at the upstream side, the second main line 152 provided at the downstream side of the first main line 151, and the third main line 153 provided at the downstream side of the second main line 152.

Three operators PB101-PB103 are assigned sequentially starting from the upstream side of the first main line 151. Eight operators PB104-PB111 are assigned sequentially starting from the upstream side of the second main line 152. One operator PB112 is assigned along the third main line 153.

The bypass line 180 consists of the first bypass line 181 provided between the first main line 151 and the second main line 152 and the second bypass line 182 provided between the second main line 152 and the third main line 153. Four robots RB101-PB104 are assigned sequentially starting from the upstream side of the first bypass line 181. One robot RB105 is assigned along the second bypass line 182.

Figure 4:
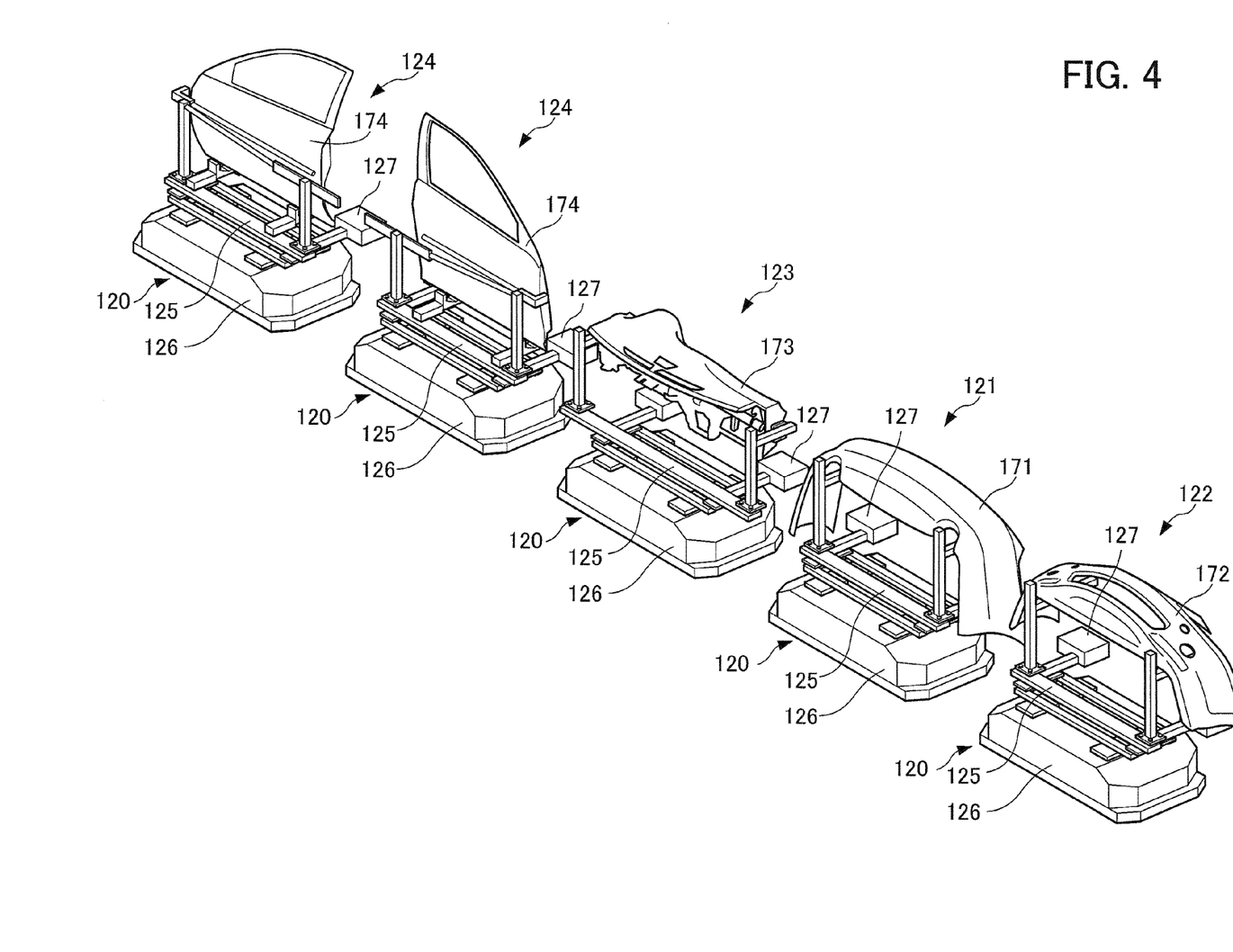
FIG. 4 is a perspective view of the travel cart of the assembly system according to the embodiment.

FIG. 4 is a perspective view of the travel cart 120. Each of the travel carts 120 is provided with the main body pallet 125 as the first pallet on which each of the main bodies 171-174 of a plurality of kinds of automotive parts is placed, the second part pallet 127 as the first pallet provided on the main body pallet 125, and the travel device 126 as the first conveyance device conveying these main body pallet 125 and the second part pallet 127 as a first combined pallet.

On the second part pallet 127, a part to be installed to each of main bodies 171-174 of automotive parts is placed according to the types of automotive parts on the travel carts 121-124 supplied to the carry-in entrance 141. Each of the travel devices 126 travels through the prescribed route according to instruction of the control device 160.

The travel carts 120 includes the travel carts 121, 122, 123, and 124 on which the main body 171 of a rear bumper, the main body 172 of a front bumper, the main body 173 of an instrument panel, and the main body 174 of a right or left door as main bodies of automotive parts placed on each of the main body pallets 125 are placed respectively.

Returning to FIG. 3, and the travel carts 121 and 122 are supplied to the outer main line 150A side of the first carry-in entrance 41. This travel carts 121 and 122 travel along the outer main line 150A and reaches the second carry-out exit 143.

The travel cart 123 is supplied to the second carry-in entrance 144. This travel cart 123 travels along the outer main line 150A and reaches the first carry-out exit 142.

The travel cart 124 is supplied to the inner main line 150B side of the first carry-in entrance 141 through the body conveyer 111C. This travel cart 124 travels along the first main line 151 of the inner main line 150B, the first bypass line 181 of the bypass line 180, the second main line 152 of the inner main line 150B, the second bypass line 182 of the bypass line 180, and the third main line 153 of the inner main line 150B. Subsequently, the travel cart 124 is carried out from the first carry-out exit 142 and reaches the body conveyer 111C.

The part pallet 130 has a box-shape, in which the upper part is opened. On this part pallet 130, a part to be installed to each of main bodies 171-174 of automotive parts is placed according to the types of automotive parts on the travel carts 121-124 supplied to the carry-in entrance 141. This part pallet 130 consists of the outside part pallet 130A supplied to the outer belt conveyer 140A and the inner part pallet 130B supplied to the inner belt conveyer 140B.

Figure 5:
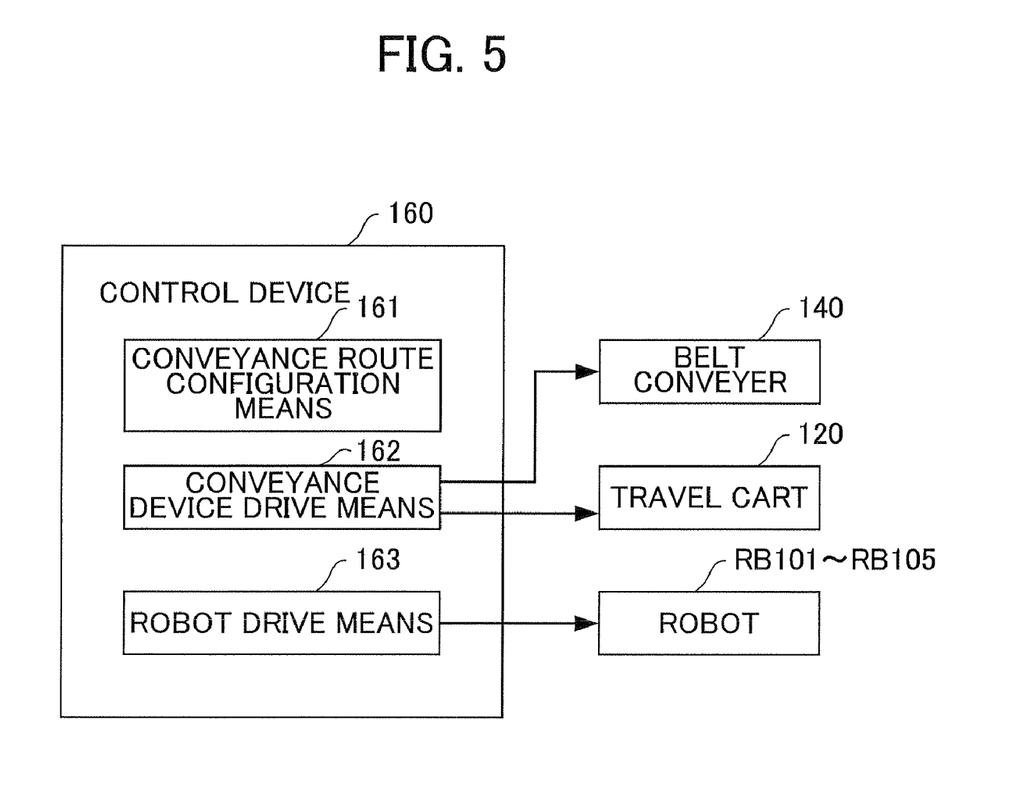
FIG. 5 is a block diagram illustrating the configuration of the assembly system according to the embodiment.

FIG. 5 is a block diagram illustrating the configuration of the control device 160. The control device 160 is provided with the conveyance route configuration means 161, the conveyance device drive means 162, and the robot drive means 163.

The conveyance route configuration means 161 sets the conveyance route of the travel device 126 of the travel cart 120 by at least one of the main line 150 and the bypass line 180. Specifically, the conveyance route configuration means 161 selects properly from among the outer main line 150A, the first main line 151, the second main line 152, and the third main line 153 of the inner main line 150B, the first bypass line 181 and the second bypass line 182 of the bypass line 180 to set the conveyance route.

The conveyance device drive means 162 allows the travel device 126 of the travel cart 120 to travel along the conveyance route set by the conveyance route configuration means 161. In addition, the conveyance device drive means 162 drives the outer belt conveyer 140A to convey the outer part pallet 130A, synchronizing with the travel carts 121-123 supplied to the outer main line 150A side of the first carry-in entrance 141. Furthermore, the conveyance device drive means 162 drives the inner belt conveyer 140B to convey the outer part pallet 130B, synchronizing with the travel cart 124 supplied to the inner main line 150B side of the first carry-in entrance 141.

The robot drive means 163 drives the robots RB101-RB105 of the bypass line 180 to take out a part from the second part pallet 127 of the travel cart 120 and then install it to the main body placed on the main body pallet 125.

Operation of the above-mentioned assembly system 101 is described as follows. The travel cart 124 reaches the first carry-in entrance 141 through the body conveyer 111C. At this point, the main body 174 of a door is detached from the body 110 and then placed on the travel cart 124 in the body conveyer 111C.

Then, the travel cart 124 travels through the first main line 151 of the inner main line 150B, the first bypass line 181 of the bypass line 180, the second main line 152 of the inner main line 150B, the second bypass line 182 of the bypass line 180, and the third main line 153 of the inner main line 150B.

In the first main line 151 of the inner main line 150B, three operators PB101-PB103 install parts to the main body 174 of a door placed on the travel cart 124. In the first bypass line 181 of the bypass line 180, three robots RB101-RB103 install parts to the main body 174 of a door placed on the travel cart 124. In the second main line 152 of the inner main line 150B, eight operators PB104-PB111 install parts to the main body 174 of a door placed on the travel cart 124. In the second bypass line 182 of the bypass line 180, one robot RB105 installs a part to the main body 174 of a door placed on the travel cart 124. In the second main line 152 of the inner main line 150B, one operator PB112 installs a part to the main body 174 of a door placed on the travel cart 124.

Then, these travel carts 124 are carried out from the first carry-out exit 142 and then reach the body conveyer 111C. The door placed on this travel cart 124 is re-installed to the body 110 on the body conveyer 111C.

The travel carts 121 and 122 are supplied to the first carry-in entrance 141 and then travel along the outer main line 150A. In the outer main line 150A, six operators PA101-PA106 install parts to the main body 171 of a front bumper and the main body 172 of a rear bumper placed on the travel carts 121 and 122 respectively. Subsequently, these travel carts 121 and 122 are carried out from the second carry-out exit 143 to install the rear bumper and the front bumper placed on the travel carts 121 and 122 respectively to the body 110 on the body conveyer 111B.

The travel cart 123 is supplied to the second carry-in entrance 144 and then travels along the outer main line 150A. In the outer operator area 150A, eleven operators PA107-PA117 install parts to the main body 173 of an instrument panel placed on the travel cart 123. Subsequently, this travel cart 123 is carried out from the first carry-out exit 142 to install the instrument panel placed on the travel cart 123 to the body 110 on the body conveyer 111A.

Figure 6:
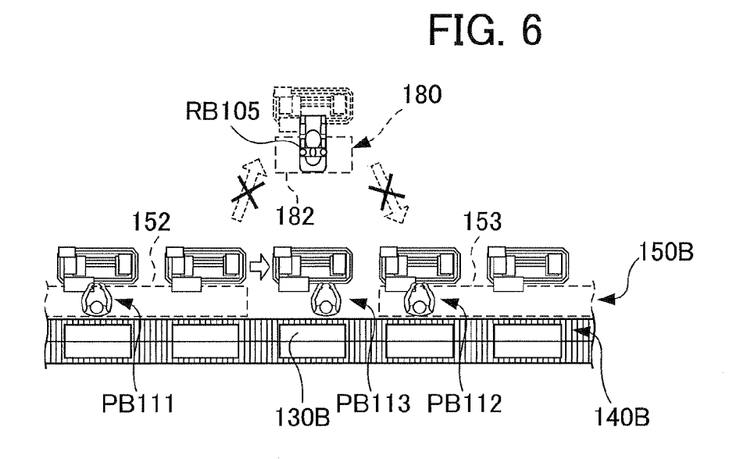
FIG. 6 is a diagram illustrating operation when all the robots along the bypass line in the assembly system according to the embodiment have a failure.

In addition, when all the robots consisting of the bypass line have a failure, the assembly system 101 responds as follows. For example, as shown in FIG. 6, when the robot RB105 of the second bypass line 182 has a failure, operation of this robot RB105 is stopped. Then, the control device 160 changes the travel route of the travel cart 124 as follows. That is, the travel route of the travel cart 124 is set so as to eliminate the second bypass line 182 from the travel route of the travel cart 124, and then head to the third main line 153 after the second main line 152. Subsequently, the operator PB113 is newly assigned between the second main line 152 and the third main line 153 to conduct assembly operation conducted by the robot RB105.

Figure 7:
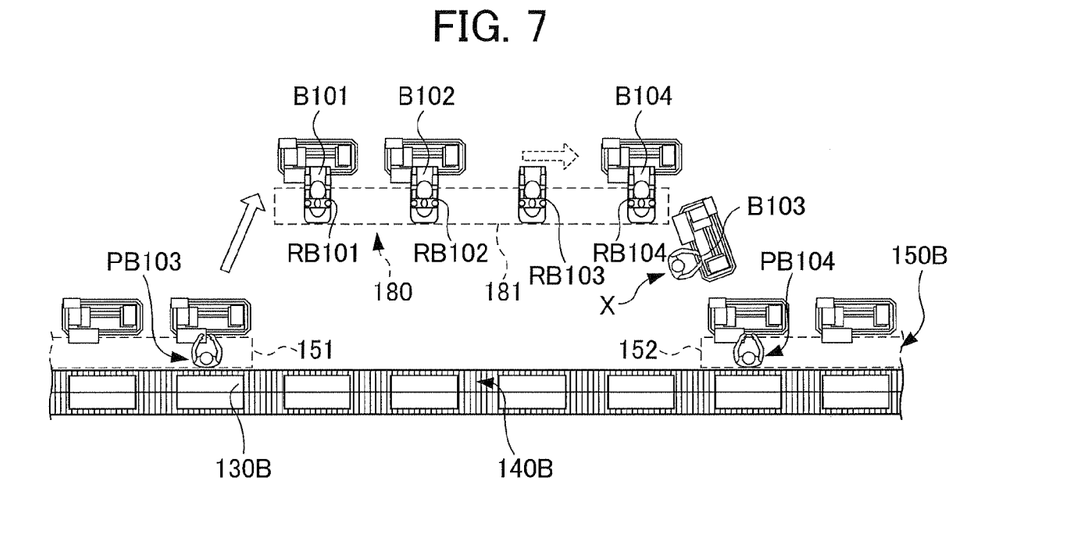
FIG. 7 is a diagram illustrating operation when a part of the robots long the bypass line in the assembly system according to the embodiment have a failure.

In addition, when a part of the robots consisting of the bypass line have a failure, the assembly system 101 responds as follows. For example, as shown in FIG. 7, when the robot RB103 of the first bypass line 181 has a failure, operation of this robot RB103 is stopped.

Parts to be installed by the robot RB101-RB104 are referred to as parts B101-B104 hereinafter. Under the condition in which the robots RB101, RB102, and RB104 are in operation, the robot RB103 does not install the part B103 to the main body of an automotive part on the travel cart 124, but the robot RB104 installs the part B104 thereto, after the robots RB101 and RB102 install the parts B101 and B102. Therefore, when the part B104 can be installed after the part B103 is installed, the control device 160 allows the travel cart 124 to pass through the robot RB103, and then an operator installs the part B103 manually at the position X of FIG. 7.

However, after the part B103 is installed, the part B104 may not be installed. For example, this is caused by a structure in which a part of the part B104 engages with the part B103 and in which the part B103 is tightened with the part B104.

In this case, as the case in which all the robots composing the above-mentioned bypass line have a failure, operation of the robots RB101-RB104 is stopped, and then the control device 160 sets the travel route of the travel cart 124 so as to eliminate the first bypass line 181 from the travel route of the travel cart 124 and then head to the second main line 152 after the first main line 151. Then, operators are newly assigned between the first main line 151 and the second main line 152 to conduct assembly operations conducted by the robots RB101-RB105.

Alternatively, operation of the robot RB104 is stopped in addition to the robot RB103, and then the control device 160 allows the travel cart 124 to pass through these robots RB103 and RB104, and then operators install the parts B103 and B104 manually at the position X of FIG. 7. According to this technique, the type of an automotive part to be manufactured can be changed, and the robots can be constructed with automotive parts continuing manufactured even when the structures of the robots RB101-RB105 are changed along with the design change.

The case in which the robot RB103 of the first bypass line 181 has a failure is described herein. However, the similar technique can be employed in the case in which other robots RB101, RB102, and RB104 has a failure.

The present embodiment provides the following effects.

(3) First, the conveyance route configuration means 161 sets the conveyance route of travel device 126 of the travel cart 120. Second, each of the main bodies 171-174 of automotive parts is placed on the main body pallets 125 of the travel carts 120, and parts to be installed to these main bodies 171-174 are placed on the second part pallets 127 and the part pallets 130 of the travel carts 120. Third, while these travel carts 120 and the part pallet 130 are conveyed synchronously, the robots RB101-RB105 of the bypass line 180 take out parts from the second part pallet 127 of the travel cart 120, and install them to the main bodies 171-174 placed on the main body pallets 125 of the travel carts 120.

Accordingly, in the main line 150, the travel cart 120 supplies the main body of an automotive part to the front side of each of the operators PA101-PA117 and PB101-PB112, and the part pallet 130 supplies the part to be installed to this main body to the rear side of each of the operators PA101-PA117 and PB101-PB112. Therefore, the operators PA101-PA117 and PB101-PB112 take out parts from the part pallets 130 at the rear side, and install them to the main bodies 171-174 placed on the main body pallets 125 at the front side. As a result, various kinds of automotive parts can be assembled on one production line with the equipment space reduced.

In addition, the operators PA101-PA117 and PB111-PB112 are assigned along the main line 150, and the robots RB101-RB105 are assigned along the bypass line 180 offset from this main line 150, so that the area at which operators are assigned and the area at which robots are assigned can be divided to ensure the safety.

(4) For example, when an operation failure of the robot RB105 placed along the second bypass line 182 occurs, this second bypass line 182 is eliminated from the travel route of the travel device 126 of the travel cart 120. Therefore, the main body pallet 125 is not conveyed along this second bypass line 182, so that it is possible to perform maintenance on the robot RB105 having a failure without stopping assembly operation of automotive parts.

(5) For example, when a operation failure of the robot RB103 along the first bypass line 181 occurs, the travel device 126 of the travel cart 120 travels so as to pass through the robot RB103 having a failure. Therefore, it is possible to perform maintenance on the robot having a failure without stopping assembly operation of automotive parts.

While preferred embodiments of the present invention have been described and illustrated above, it is to be understood that they are exemplary of the invention and are not to be considered to be limiting. Additions, omissions, substitutions, and other modifications can be made thereto without departing from the spirit or scope of the present invention. For example, in the above-mentioned first embodiment, the travel carts 21-24 supplied to the inner operator area 50B side of the carry-in entrance 41 travel along the inner operator area 50B and are carried out from the first carry-out exit 42, but are not limited thereto. The travel carts 21-24 may be carried out from any points between the carry-in entrance 41 and the first carry-out exit 42 as shown by the arrows X and Y in FIG. 1.

In addition, in the first embodiment, the travel carts 21 and 22 are carried out from the body conveyer 11B, and the travel carts 23 and 24 are carried out from the body conveyer 11A, which means that the travel carts 22-24 are carried out to one body conveyer, but are limited thereto. The travel carts 22-24 may be carried out to a plurality of body conveyers.

Furthermore, in the first embodiment, automotive parts placed on the travel carts 21-24 are installed to the body 10 immediately after being is carried out from the carry-out exits 43-45, but are not limited thereto. That is, a buffer area at which the travel carts 21-24 can stop may be provided between the body conveyer 11 on which the body 10 is conveyed and the carry-out exits 43-45. In this case, it is possible to assemble automotive parts in advance and stock the assembled automotive parts. In addition, various kinds of supply quantities and orders can be changed properly in proportion to the amount of the buffer.

What is claimed is:

1. An assembly system assembling a plurality of kinds of automotive parts, each kind including a main body and a part to be installed to the main body, comprising:
    a plurality of first combined pallets on each of which one main body and one respective part of one of the plurality of kinds of automotive parts are placed in a main body pallet and a first part pallet, respectively;
    a plurality of second part pallets on each of which one part of one of the plurality of kinds is placed;
    a first conveyance device conveying one of the first combined pallets;
    a second conveyance device conveying one of the second pallets;
    a main line along which an operator is assigned;
    a bypass line offset from the main line, along which a robot is assigned;
    a control device controlling thereof, wherein the control device is provided with a conveyance route configuration unit setting a conveyance routes of the first and second conveyance devices by at least one of the main line and the bypass line,
    a conveyance device drive unit driving the first and second conveyance devices to convey the one first combined pallet and the second pallet synchronously along the conveyance routes set by the conveyance route configuration unit, and
    a robot drive unit driving the robot along the bypass line to take out the one respective part from the one first combined pallet and then install the one respective part from the first part pallet to the one main body placed on the one first combined pallet.

2. The assembly system according to claim 1, wherein the conveyance route configuration unit of the control unit eliminates the bypass line from the conveyance route under certain conditions.

3. The assembly system according to claim 1, wherein the conveyance device drive unit of the control unit conveys the one first combined pallet so as to pass at least one of robots along the bypass line, under certain conditions.

* * * * *